UNITED STATES PATENT OFFICE.

ALFRED LEBLANC, OF CIENFUEGOS, SANTA CLARA, CUBA.

PROCESS OF EXPRESSING SUGAR-CANE JUICE.

SPECIFICATION forming part of Letters Patent No. 304,013, dated August 26, 1884.

Application filed April 29, 1884. (No specimens.)

*To all whom it may concern:*

Be it known that I, ALFRED LEBLANC, a citizen of France, residing at Cienfuegos, Province of Santa Clara, Isle of Cuba, have invented a certain new and useful Process for Expressing Sugar-Cane Juice; and I hereby declare the same in and by the following full, clear, and exact description thereof, which will enable those skilled in the art to which my invention appertains to make and use the same.

This invention relates, particularly, to the expressing of sugar-cane juice. Its object is to extract the juice of the cane more economically and thoroughly than has heretofore been done; and it consists, essentially, in an improved mode of moistening the cane while being pressed. The usual manner of pressing sugar-cane is to run it through a machine provided with parallel rolls adapted to crush and squeeze the cane, these rolls being arranged in two or more pairs, or grouped around one another, so that two or more successive and increased pressures can be given to the cane. Ordinarily these machines are constructed to give but two or three pressures to the cane, for the slight gain in the quantity of juice resulting from an additional third or fourth pressure does not compensate for the extra outlay in machinery and driving-power necessary to secure such additional pressure. It is therefore very desirable to express as much juice as possible by as few pressures as are practicable. It is also customary to subject the pressed cane or bagasse, after each pressure but the last, to injections of some liquid for the purpose of moistening the bagasse preparatory to the following pressure, or to injections of steam to both moisten the bagasse and to coagulate the albuminous matter contained therein, so that such matter may adhere to and pass off with the bagasse. It is to be understood that the bagasse comes from each pressure in a comparatively dry, fine, and spongy condition, and that while in this condition its property of absorption is highly active, particularly as to its own expressed juice; and, therefore, to prevent this absorption of the expressed juice it is requisite that the bagasse be moistened by some liquid to its full capacity of absorption. Furthermore, it should be understood that when the crushed bagasse is subjected to such a degree of saturation that its remaining juice is dissolved or diluted the diluting-liquid, when expressed, will carry off the juice with which it is mixed. By the old method of treatment, where only a liquid was used, the latter of these desired results was not attained because the juice remaining in the bagasse was too closely associated with its structure to be reached by the liquid; and by the method where steam was used the heat of the steam so debilitated the vitality of the bagasse that it could not absorb sufficient moisture to make the next pressure effective, and caused the dissipation of the juice and its closer interrelation with the bagasse. The present method of treating the bagasse, therefore, consists in causing the bagasse, immediately upon its coming from the first pressure, to be moistened with a liquid to the full extent of the absorbing power of the mass. It is then injected by steam, and then receives another pressure. By this method of treatment the bagasse is charged with all the water or other liquid it can absorb, which brings it to the proper condition to be acted upon by the steam—that is, a condition which prevents the steam from still further drying it or destroying the life of its fiber; and as the bagasse receives the injected steam the absorbed water is heated and caused to completely saturate the mass and dilute the remaining juice, so that the following pressure may be made practically exhaustive. More than two pressures may, of course, be given to the cane, and in some cases this is desirable, the treatment following the second or any succeeding pressure being the same as that described as following the first pressure. The purpose of the steam (aside from coagulating the albuminous matter in the cane, which is done as effectively in this process as is necessary) is, essentially, to heat the absorbed water and cause it to diffuse through the mass of fiber more completely than it can by absorption, and thereby dissolve or dilute the remaining juice. This result, therefore, may possibly be accomplished in a degree by substituting for the steam hot air or very hot water; but steam will be found the most serviceable as well as economical. The character of the liquid with which the bagasse is injected immediately after a pressure may vary; it may be water, or water chemically prepared, or otherwise treated, and it may be slightly heated. This process may be carried out in various forms of machines; but a machine particularly adapted to its practice forms the subject-matter of a separate application now pending.

What I claim as new is—

The herein-described process of expressing sugar-cane juice, consisting of first pressing the cane, then moistening it, then steaming it, and then re-pressing it, substantially as described.

ALFRED LEBLANC.

Witnesses:
GEORGE KEITH,
ROBT. EDGAR.